(12) United States Patent
Burkhard et al.

(10) Patent No.: US 11,231,314 B2
(45) Date of Patent: Jan. 25, 2022

(54) CALIBRATION WEIGHT ASSEMBLY FOR A GRAVIMETRIC MEASURING DEVICE

(71) Applicant: Mettler-Toledo GmbH, Greifensee (CH)

(72) Inventors: Hans-Rudolf Burkhard, Wila (CH); David Koller, Zürich (CH); Andreas Metzger, Männedorf (CH); George Fankhauser, Erlenbach (CH)

(73) Assignee: Mettler-Toledo GmbH, Greifensee (CH)

( * ) Notice: Subject to any disclaimer, the term of this patent is extended or adjusted under 35 U.S.C. 154(b) by 267 days.

(21) Appl. No.: 16/709,190

(22) Filed: Dec. 10, 2019

(65) Prior Publication Data

US 2020/0191641 A1    Jun. 18, 2020

(30) Foreign Application Priority Data

Dec. 14, 2018  (EP) ..................................... 18212495

(51) Int. Cl.
*G01G 23/01* (2006.01)

(52) U.S. Cl.
CPC .................... *G01G 23/01* (2013.01)

(58) Field of Classification Search
CPC ................................................. G01G 23/01
USPC ........................................................ 73/1.13
See application file for complete search history.

(56) References Cited

U.S. PATENT DOCUMENTS

| 4,425,975 | A | * | 1/1984 | Luchinger | G01G 23/012 |
| | | | | | 177/212 |
| 4,932,487 | A | * | 6/1990 | Melcher | G01G 21/286 |
| | | | | | 177/180 |
| 4,977,969 | A | * | 12/1990 | Leisinger | G01G 23/012 |
| | | | | | 177/50 |
| 5,148,881 | A | | 9/1992 | Leisinger | |
| 6,194,672 | B1 | | 2/2001 | Burkhard et al. | |
| 7,631,536 | B2 | | 12/2009 | Genoud et al. | |
| 8,581,121 | B2 | | 11/2013 | Burkhard et al. | |
| 10,168,203 | B2 | | 1/2019 | Reber | |
| 2004/0003948 | A1 | * | 1/2004 | Kuhlmann | G01G 23/012 |
| | | | | | 177/132 |

(Continued)

FOREIGN PATENT DOCUMENTS

DE          20318788 U1    5/2004
DE       102009009204 B3    4/2010

*Primary Examiner* — Nathaniel T Woodward
(74) *Attorney, Agent, or Firm* — Standley Law Group LLP; Jeffrey S. Standley; Stephen L. Grant

(57) ABSTRACT

A calibration weight assembly (100, 200, 300, 400, 500) has at least one calibration weight (150, 550, 750) and a transfer mechanism, and is used with a gravimetric force-measuring device (110, 210, 310, 410, 510) having a fixed region (111, 211, 311, 411, 511), a load-receiving region (112, 212, 312, 412, 512), and a measuring sensor (140, 540). The transfer mechanism has at least one poly-stable positioning element (561, 571), a first stable state of which defines a calibration position (KP) and a second stable state of which defines a resting position (RP) of the transfer mechanism. The at least one calibration weight can be coupled with the load-receiving region. The transfer mechanism, as actuated by the measuring sensor, transfers the at least one calibration weight from the calibration position to the resting position, or vice versa.

17 Claims, 6 Drawing Sheets

(56) References Cited

U.S. PATENT DOCUMENTS

2011/0147099 A1* 6/2011 Burkhard .............. G01G 21/00
  177/246
2013/0233045 A1* 9/2013 Burkhard ................ G01G 7/04
  73/1.13

* cited by examiner

CALIBRATION WEIGHT ASSEMBLY FOR A GRAVIMETRIC MEASURING DEVICE

CROSS-REFERENCE TO RELATED APPLICATIONS

This application claims the benefit of priority to European patent application 18212495.8, filed on 14 Dec. 2018, which is incorporated by reference as if fully recited herein.

TECHNICAL FIELD

The invention relates to a calibration weight assembly for a gravimetric measuring device, particularly a scale, as well as a method for operating a calibration weight assembly.

BACKGROUND ART

With force-measuring devices, for example with load cells, which function according to the principle of electromagnetic force compensation, also known as electromagnetic force restoration or EMFR load cells, the weight force of the sample being weighed is transferred to an electromechanical measuring sensor either directly or via one or more power transfer levers supported on bearings. The measuring sensor generates a compensation force corresponding to the weight force of the sample being weighed and, in doing so, provides an electrical signal, which is further processed and displayed by weighing electronics of the processing unit.

An EMFR load cell usually has a parallelogram with a fixed region or parallel legs and one parallel leg, which serves as the load-receiving region, movably connected thereto by two parallel guides. In lever systems, the weight force is transferred to a weight beam, which is supported on a fixed parallel leg, via a coupling element which is longitudinally stiff, flexible, and coupled with the load-receiving region. The purpose of such a load cell is to underpin the weight force corresponding to the placed load to the extent that the measuring sensor generating the compensation force can output a measuring signal corresponding to the weight force. As is known, the connecting points of the individual elements in high-resolution load cells are designed from flexible bearings. Flexible bearings define an axis of rotation between the two coupled elements and may be designed as thin material points with a single-part load cell, also called a monolithic load cell or monoblock.

In EMFR load cells in which the weight force is compensated directly, that is without underpinning the compensation force by means of levers, by the compensation force generated by the measuring sensor, the parallel guides are usually designed as spring elements and/or spring joints or membranes. With such load cells, also called direct measuring systems, a compensation force correspondingly equal in size to the weight force of the load is met by a measuring sensor.

Typically, a force-measuring device comprises a force sensor, a transfer of force, a force-measuring cell, and a device for processing measuring signals. In this case, a force to be measured is absorbed by means of the force sensor and transferred to the force-measuring cell via the transfer of force, where it acts upon the force-measuring cell as supplied force. For example, with a gravimetric measuring instrument, the force to be measured results from the weight force of the sample being weighed, said weight force acting on the gravimetric measuring instrument in the form of a scale pan and acting on the force-measuring device, also called the load cell, in the form of a rod, via the transfer of force.

The force-measuring device is a mechanical-electrical converter, which converts the supplied force into an electrical measuring signal. This measuring signal, which corresponds to the acting force, is transferred to a processing unit and processed and evaluated there. The results of the processing are transferred, as measurement values, to a display unit or to a further processing unit, for example to a master computer or a system control.

In order to ensure high and consistent accuracy, a correction process, known as calibration, is necessary from time to time. In this process, a specified force is supplied to the force-measuring device such that the force-measuring device generates a measuring signal, which corresponds to the specified force and which is transferred to the processing unit. Corresponding corrective measures can then be undertaken, for example the adaptation of the calculation parameters in the processing unit, from a comparison between a specified force and the measurement values determined therefrom.

Gravimetric measuring instruments, e.g. electronic scales, are frequently calibrated by means of an internal calibration weight. For calibration, a calibration weight with a defined mass is placed in force-contact with the force-measuring device of an arranged gravimetric measuring instrument and then determined as a reference value. By means of this reference value, further weighing parameters of the scale can be equalized. After successful calibration, the contact between the calibration weight and the force-measuring device is severed and the calibration weight is stopped in a resting position. The calibration weight in this case is moved from a resting position into a calibration position and back again by means of a transfer mechanism. In the calibration position, the calibration weight is in force-contact with the force-measuring device; there is no force-contact in the resting position.

In order to generate the specified force and to supply said force to the force-measuring device, often a calibration device is used. In doing so, the calibration device is coupled, in a force-fitting manner, to the force-measuring device during a calibration process, and the force generated by the calibration device is transferred to the force-measuring device. The coupling is severed following the calibration process such that the force-measuring device is separate from the calibration device during normal measuring operation.

Calibration devices are known from the prior art. For example, CH 676 750 A5 discloses a calibration device with a specified calibration weight, which can be lowered onto a carrier coupled to the force-measurement device by means of a lifting device and thus can be coupled to the force-measuring device. In this case, the calibration weight is lowered in the vertical direction at the start of the calibration process with an electric motor and a rotatable spindle and then lifted again after the calibration process.

EP 0 955 530 A1 discloses the arrangement of the calibration device in the direct vicinity of the force-measuring cell in the housing of a force-measuring device, wherein a lever arm has an extension, which is equipped with a coupling region for the calibration weight. The calibration weight is conveyed from the resting position into the calibration position and back again into the resting position by a lift-lower mechanism.

EP 0 468 159 B1 discloses a calibration weight assembly with a calibration weight, which moves vertically via wedges paired with one another horizontally and thus is placed in force-contact with the force-measuring device of the gravimetric measuring instrument. This transfer mechanism is driven by means of a spindle connected to the wedges and a motorized drive.

DE 203 18 788 U1 describes how a single-part calibration weight is lifted and lowered by a ramp-like lifting element, wherein the lifting element driven by a linear drive executes a type of tilted parallel movement.

The aforementioned lifting elements are generally driven by small servomotors. The disadvantage when using servomotors is that relatively much space is required in the force-measuring device of the gravimetric measuring instrument, whereby both the force-measuring device and the gravimetric measuring instrument itself are unnecessarily enlarged.

Specifically with highly sensitive electronic scales, the weighing result is influenced and even changed by electrostatic discharge and interactions. The servomotors used for driving the transfer mechanisms contain electrically non-conductive gear parts, which generate electrostatic fields due to friction during operation. The resulting electrostatic fields, but also electromagnetic fields, are sufficient for influencing the weighing result, particularly of highly sensitive gravimetric measuring instruments.

SUMMARY OF THE INVENTION

The object upon which the present invention is based is to provide a calibration weight assembly and a method for operating said calibration weight assembly, which overcome the disadvantages of the prior art.

This object is achieved with a calibration device having the features indicated in the independent claims. Advantageous embodiments of the invention are indicated in the further, dependent claims.

The object is achieved by means of a calibration weight assembly for a gravimetric measuring device with a force-measuring device having a fixed region, a load-receiving region, and a measuring sensor, wherein the calibration weight assembly comprises at least one calibration weight which can be coupled with the load-receiving region and a transfer mechanism in order to transfer the at least one calibration weight from a resting position into a calibration position or from the calibration position into the resting position, respectively, during a movement phase, wherein the transfer mechanism has at least one poly-stable positioning element, the first stable state of which defines the calibration position and the second stable state of which defines the resting position of the transfer mechanism.

According to the invention, the calibration weight assembly is designed such that it transfers, as a drive of the transfer mechanism, the calibration weight from the resting position into the calibration position or from the calibration position into the resting position, respectively, during a movement phase by means of suitable actuation of the measuring sensor.

In one force-measuring device, based on the principle of electromagnetic force compensation, the measuring sensor is a force converter used to convert the weight force into an electrical measuring signal, said force converter usually having a permanent magnet system with an air gap established in the fixed region and a coil which has a compensation current flowing through it during operation of the force-measuring device and which moves in the air gap. Coil and permanent magnet system can also be used interchangeably here. A controller regulates the compensation current during operation of the force-measuring device based on a position-sensor signal such that the coil and the load sensor connected thereto are moved back into a specified zero position for determining an applied force by means of the electromagnetic force between the coil and the permanent magnet system. In other words, the controller ensures that the electromagnetic compensation force maintains equilibrium with the applied weight force, which is the case in the zero position. By specifying a target position, the compensation current regulated by the controller is routed through the coil and, in doing so, deflects the coil accordingly.

It is especially advantageous that a separate drive can be omitted for the transfer mechanism due to the additional function of the measuring sensor.

In an advantageous design of the invention, the center of mass of the calibration weight is arranged on the resultant force of the measuring sensor or on the axis extending parallel to the resultant force of the measuring sensor.

In a further design, the poly-stable positioning element further has a guide piece with a guide die and a guide bolt, wherein either the guide piece is established at the fixed region and the guide bolt at the calibration weight, or the guide bolt is established at the fixed region and the guide piece at the calibration weight. In this process, it is insignificant whether the guide piece or the guide bolt is established directly at the fixed region or with a part of the force-measuring device connected to the fixed region.

In a further advantageous design, the form and the position of the guide die are matched to the movement sequence of the calibration weight such that the guide bolt always passes the guide die through the gravitational force vector in the clockwise or counterclockwise direction.

Preferably, the calibration weight is formed concentrically or rotatably about the resultant force of the measuring sensor, particularly has the form of a ring, or the calibration weight is formed in the shape of a cylinder or barbell.

In a different design, the poly-stable positioning element has three pairs comprising one guide piece and one guide bolt each, wherein the pairs are arranged concentrically equidistant to one another, or the poly-stable positioning element has two pairs comprising one guide piece and one guide bolt each, wherein the pairs are arranged on the end surfaces of a cylinder-shaped or barbell-shaped calibration weight. Furthermore, the depth of the guide die may be designed to increase in the direction of the gravitational force. This helps keep the calibration weight always in the middle in the resting position, i.e. centered, when settling in.

In another advantageous design, the transfer mechanism furthermore has an extension attachment with a receiving device for the calibration weight, said extension attachment being connected to a moving part of the measuring sensor.

In a first use of the previously described calibration weight assembly in a force-measuring device, the fixed region of the force-measuring device encloses the load-receiving region, and the calibration weight assembly ( ) in this case is arranged above or below the measuring sensor. Furthermore, the extension attachment can be established directly on the load-receiving region.

In a first variant of a second use of the previously described calibration weight assembly in a force-measuring device, the load-receiving region is connected to the fixed region, movably guided through the parallel legs, wherein the force-measuring device furthermore has a first lever with an input-side lever arm, which is connected to the load-receiving region in a force-transmitting manner, and an output-side lever arm, which is connected to the measuring sensor directly in a force-transmitting manner. In addition, the fixed region or the load-receiving region has an extension, which is equipped with a coupling region for the calibration weight.

In a second variant of the second use of the previously described calibration weight assembly in a force-measuring device, the output-side lever arm is indirectly connected, in a force-transmitting manner, to the measuring sensor via at least one second lever. In this second variant, the input-side lever arm of the first lever has the extension, which extends in this case into the space adjoining the side of the load-receiving region, said side facing away from the fixed region, and is equipped there with a coupling region for the calibration weight, and wherein the measuring sensor is arranged in the space adjoining the side of the load-receiving region, said side facing away from the fixed region.

In one method for operating a calibration weight assembly, the force-measuring device has a measuring sensor with a permanent magnet system, with an air gap, and with a coil, which has a compensation current flowing through it during operation of the force-measuring device and which moves in the air gap, in order to output a measuring signal, wherein the method comprises at least the following steps: providing the calibration weight in a resting position; changing the compensation current such that the coil is deflected in the direction of the resting position of the calibration weight, and upon which contact is established with the calibration weight; actuating the compensation current such that the coil is further deflected such that the calibration weight is moved from the resting position into a calibration position or from the calibration position into the resting position, respectively; changing the compensation current such that the receiving device moves away from the calibration weight after achievement of the resting position of the calibration weight.

In a further method, the force-measuring device has a controller, which controls the compensation current during operation of the gravimetric measuring device based on a position sensor signal such that the coil is moved back into a zero position specified for determining an applied force due to the electromagnetic force between the coil and the permanent magnet system. The method further comprises the following steps: recording the position sensor signal with dependency on the actuated compensation current; comparing the recorded dependency with a reference dependency stored in a storage device, and outputting a transfer alarm, which represents the exceeding of a tolerance value between the recorded dependency and the reference dependency; and, when a transfer alarm is output, using an algorithm, which contains at least one change in the compensation current opposite the movement phase. This algorithm is used to prevent or loosen any jamming of the poly-stable positioning element.

In order to protect the force-measuring device and the elements or components thereof, a mechanical stop may be provided, which limits the deflection. In the case of a calibration process, this can be suspended automatically as an upstream step in order to use the complete deflection capacity of the coil. After completion of the calibration process, the mechanical stop is then reestablished for weighing mode.

In a further advantageous method, the calibration position corresponds to the position that is moved back to controllably in order to determine an applied force of the measuring sensor, particularly the zero position.

BRIEF DESCRIPTION OF THE FIGURES

Individual details of the force-measuring device according to the invention, of the force-measurement module according to the invention, and of the method according to the invention result by means of the description of the exemplary embodiments shown in the drawings. The following are shown:

FIG. 7b is an isometric view of the calibration weight assembly of FIG. 7a;

BRIEF DESCRIPTION OF THE FIGURES

Features with the same function and similar design are given the same reference signs in the following description.

Figure 1:
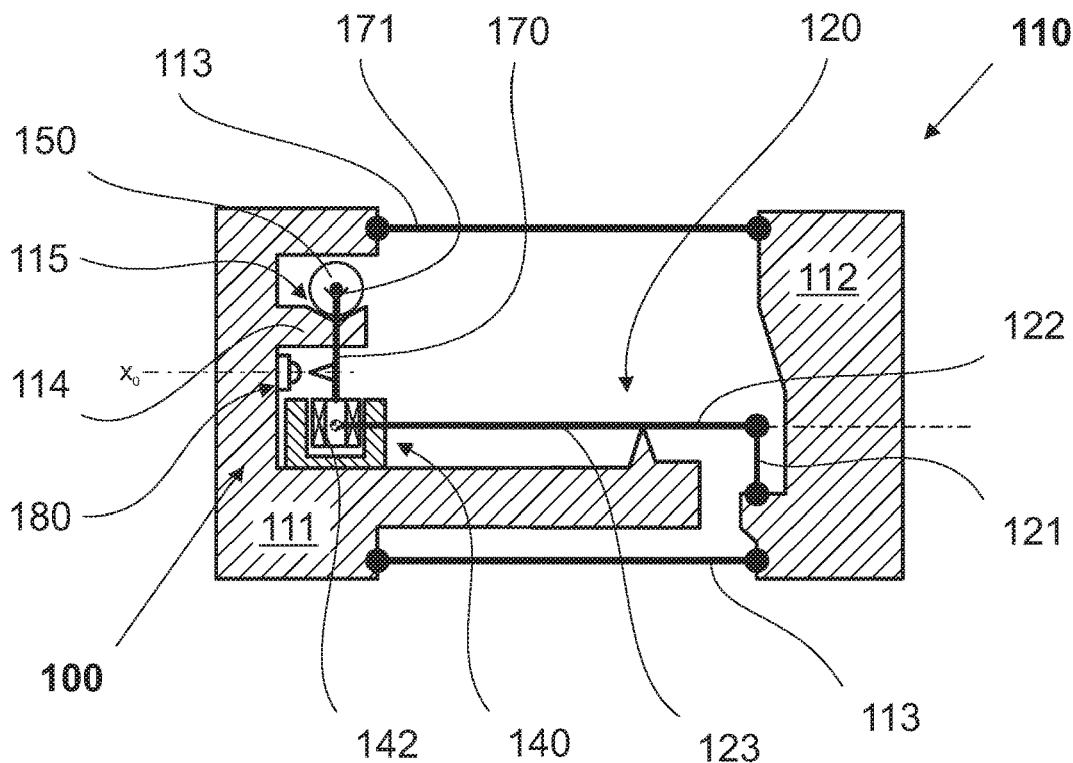
FIG. 1 is a schematic representation of a force-measuring device with a lever system and a first variant of a first calibration weight assembly.

FIG. 1 shows a schematic representation of a force-measuring device 110 in the longitudinal direction with a calibration weight assembly 100. The force-measuring device 110 comprises a fixed region 111, a load-receiving region 112, and an upper as well as a lower parallel leg 113. By means of a force-transmitting element 121, a first lever 120 is connected to the load-receiving region 112 on the input-side lever arm 122 of the first lever. The output-side lever arm 123 of the first lever 120 is connected to the measuring sensor 140. A position sensor 108 records the deflection of the measuring sensor 140 from a zero position $x_0$ in which the measuring signal of the measuring sensor 140 corresponds to the weight placed on the load sensor 112. The fixed region 111 has a cantilever 114, which is equipped with a coupling region 115 for the calibration weight 150 in the resting position RP. An extension attachment (170) with the receiving device 171 is connected to the moving part of the measuring sensor 140, which is to the coil 144 in this case.

The measuring sensor 140, which is shown in simplified form in FIG. 1, usually comprises a permanent magnet system 141, which is connected to the fixed region 111 here, and a coil 144, which is enclosed by said permanent magnet system 141. If the coil 144 is deflected, upward in FIG. 1 here, strongly enough, the receiving device 171 is placed into contact with the calibration weight 150.

Figure 2:
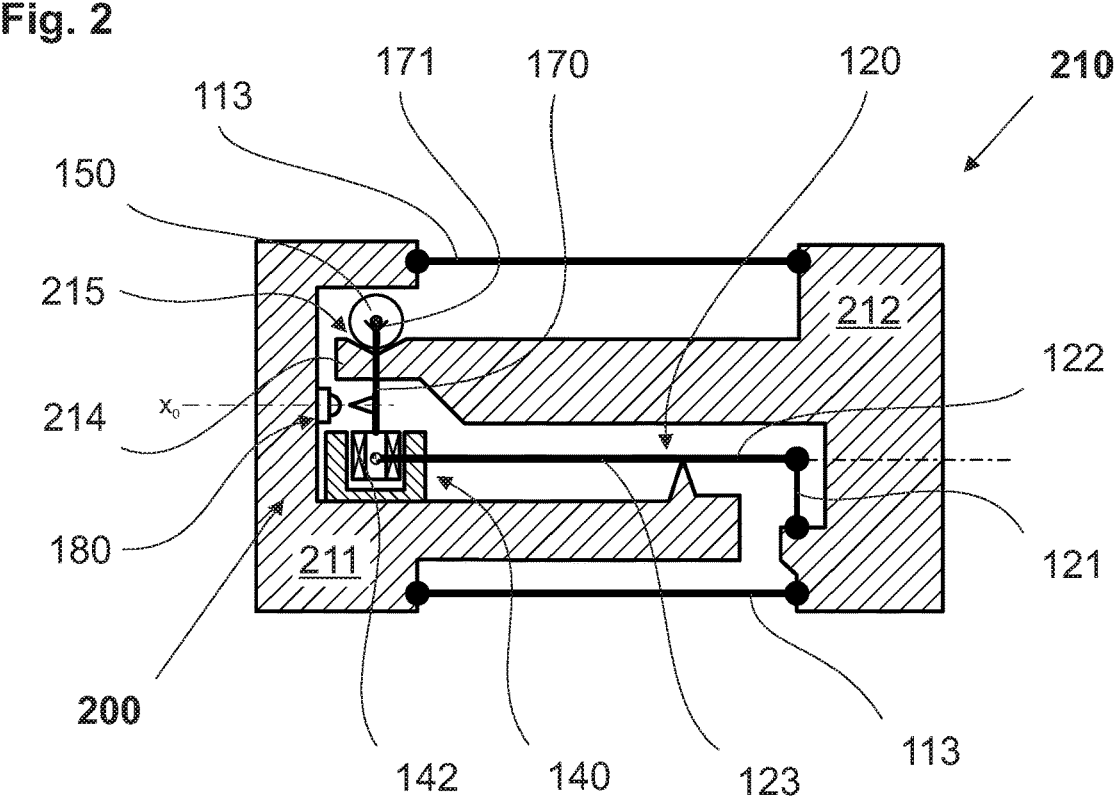
FIG. 2 is a schematic representation of a force-measuring device with a lever system and a second variant of a first calibration weight assembly.

The schematic representation of the force-measuring device 210 in FIG. 2 largely corresponds to that in FIG. 1 with the difference that the load sensor 212 has a cantilever 214, which is provided with a coupling region 215 for the calibration weight 150 in the resting position RP. The calibration weight 150 is also placed into contact with the receiving device 171 here as soon as the coil 144 has been sufficiently strongly deflected.

Figure 3:
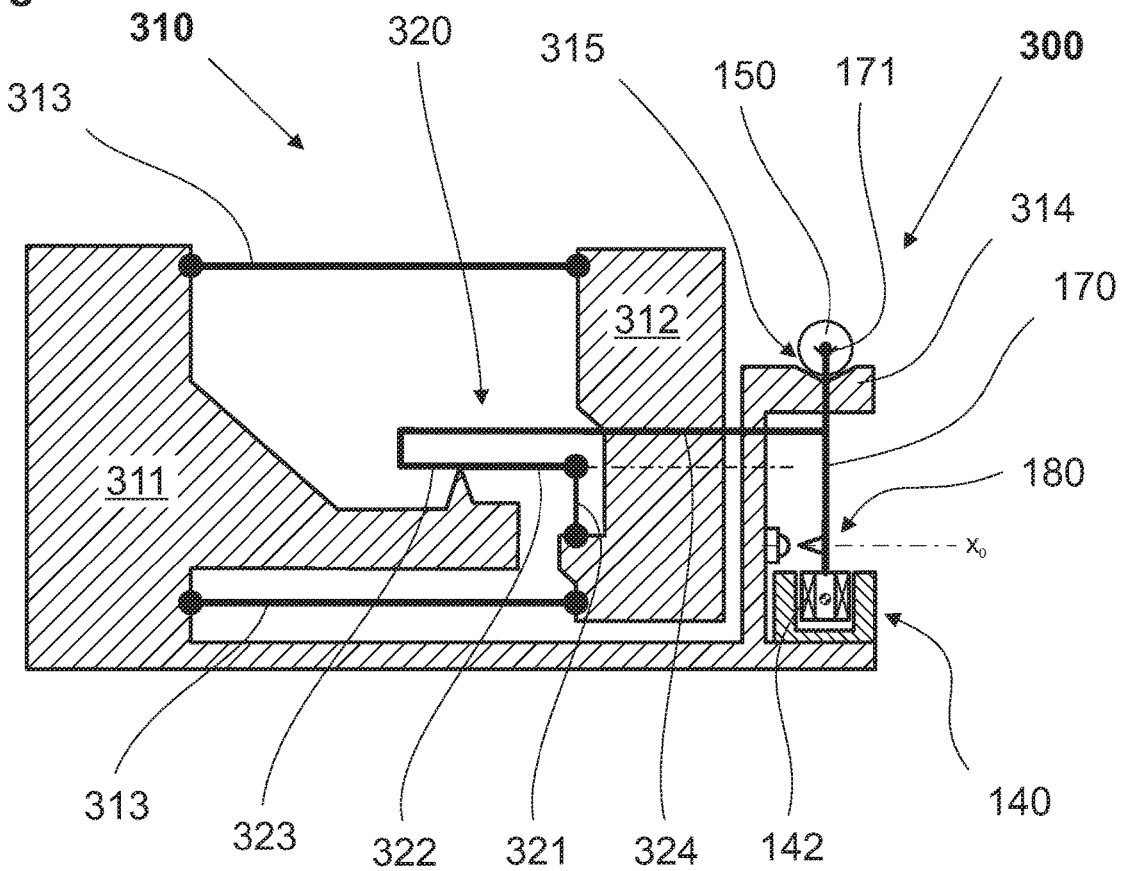
FIG. 3 is a schematic representation of a force-measuring device with a lever system and a first variant of a second calibration weight assembly.

In FIG. 3, which is a further schematic representation of a force-measuring device 310 with a calibration weight assembly 300, the cantilever 314 extends into the space adjoining the side of the load-receiving region 312, with the side facing away from the fixed region 311. The cantilever 314 has a coupling region 315 for coupling the calibration weight 150 in the resting position RP. The input-side lever arm 322 of the first lever 320, which has an extension 324, likewise extends into this space, is connected there to the extension attachment 170, and provided with a receiving device 171 for the calibration weight 150. The measuring sensor 140 is likewise situated on the side of the load sensor 312 facing away from the fixed region 311.

Figure 4:
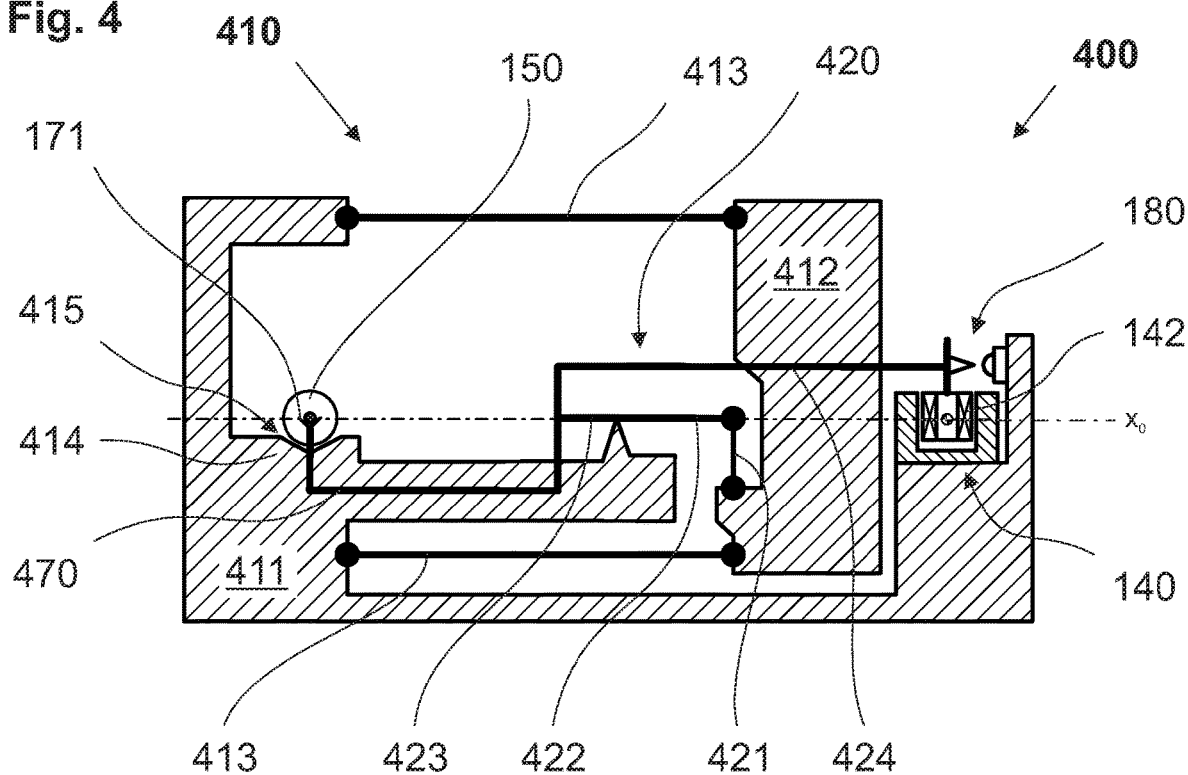
FIG. 4 is a schematic representation of a force-measuring device with a lever system and a second variant of the second calibration weight assembly.

FIG. 4 shows a further representation of a force-measuring device 410 with a calibration weight assembly 400. The calibration weight 150 does not necessarily have to be arranged directly over the measuring sensor 180. As in FIG. 3, the measuring sensor 140 is situated on the side of the load sensor 412 facing away from the fixed region 411. For coupling the calibration weight 150 in the resting position RP, the fixed region 411 has a coupling region 415. As it is shown in FIGS. 1 to 3, the cantilever is part of the fixed region 411, and/or the cantilever 414 is integrated into the fixed region 411 in FIG. 4. In this force-measuring device 410, the first lever 420 has an extension 424, which is connected to the measuring sensor 140 and the position sensor 180. In the opposite direction, the second lever arm 423 is connected to an extension attachment 470 with a receiving device 171 for the calibration weight 150.

FIGS. 1 to 4 show force-measuring devices as single-lever systems. Of course, the force-measuring devices 110, 210, 310, 410 may also be designed as a multi-lever system. In general, it is advantageous to arrange the center of mass of a component on the first lever 120, 320, 420, such as, for example, that of the coil 144, of the diaphragm of the position sensor 180, of the calibration weight 150 situated in the receiving device 171, or also that of the respective lever arms 122, 322, 422, 123, 323, 423 on the same horizontal plane, which extends through the point of rotation of the first lever 120, 320, 420. This arrangement of the centers of mass makes a force-measuring device level less sensitive. In order to make the force-measuring device less sensitive to errors with an eccentric placement of weight, these centers of mass must be arranged on the same or close to the same vertical plane, which extends through the force-measuring device symmetrically in the longitudinal direction. The distance between the receiving device 171 and the point of rotation of the first lever 120, 320, 420 can be selected minimally enough such that the guide bolt can also be guided through the guide die. In the direction of the maximum distance, the cohesive factors to be considered are the mass of the calibration weight and the electromagnetic force that can be supplied by the transducer.

Figure 5:
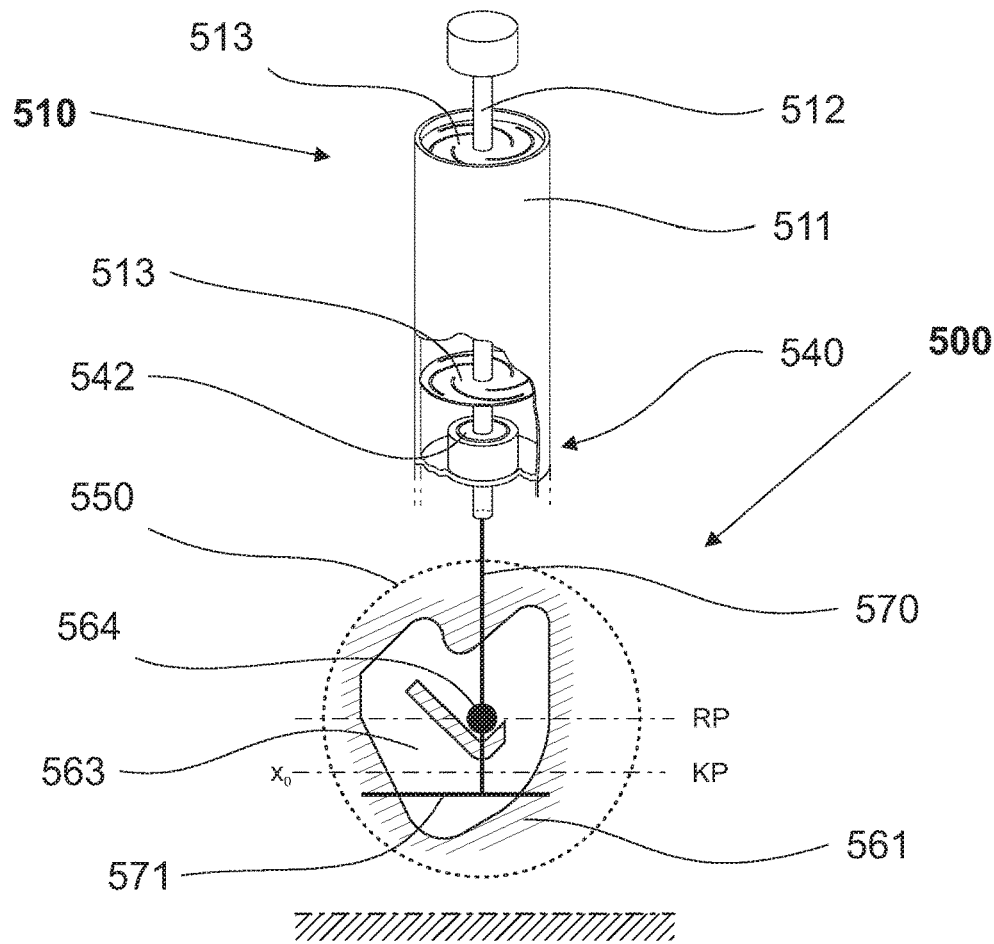
FIG. 5 is a simplified representation of a direct measuring system with a calibration weight assembly in a schematic view in the resting position.

A force-measuring device 510 with a calibration weight assembly 500 is shown in FIG. 5, wherein the force-measuring device 510 is designed as a direct measuring system. The force-measuring device 510 likewise comprises a fixed region 511, a load-receiving region 512, and an upper as well as a lower parallel leg 513. The measuring sensor 540 is directly connected to the load sensor 512, and a position sensor (not shown) records the deflection of the measuring sensor 540, in which the measuring signal of the measuring sensor 540 corresponds to the weight placed on the load sensor 512. An extension attachment 570 with the receiving device 571 is connected to the moving part of the measuring sensor 540, which is to the coil 544 in this case. If the coil 544 is deflected, upward in FIG. 5 here, strongly enough, the receiving device 571 is placed into contact with the calibration weight 550.

The lower region of FIG. 5 depicts the situation in which the calibration weight 550 is in the resting position RP, and the force-measuring device 510 is in the zero position $x_0$. FIGS. 6a to 6f are intended to show the movement sequence of the transfer mechanism, which transfers the calibration weight 550 from the resting position RP into the calibration position KP and back again. The transfer mechanism has a poly-stable positioning element, which has a guide piece 561 with a guide die 563 and a guide bolt 564, wherein the guide piece 561, which is indicated by the hatched background, is established on the fixed region 511 and the guide bolt 564 is established on the calibration weight 550 in this case.

Figure 6A:
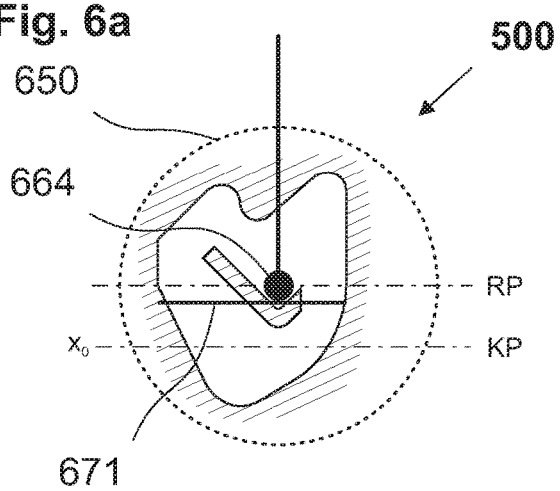
FIGS. 6a to 6f schematically depict the movement sequence of the calibration weight assembly from FIG. 5 in six steps.
Figure 6B:
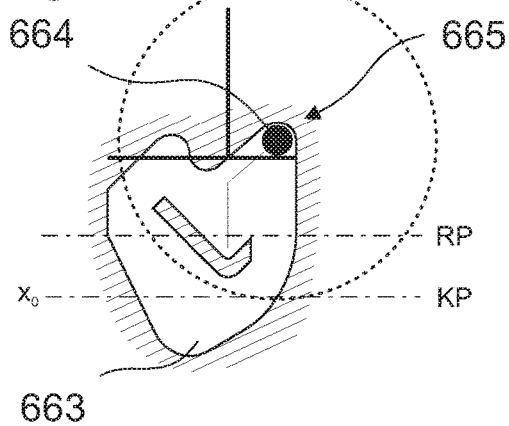
Figure 6C:
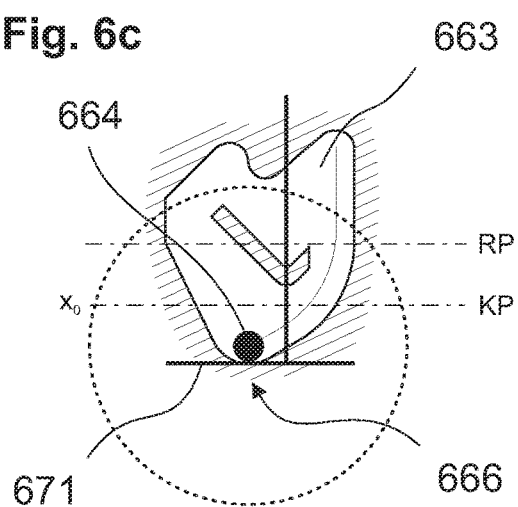

The movement sequence is described in the following FIGS. 6a to 6f, wherein a fine line represents the path traveled since the previous figure. If the coil 544, see FIG. 5, is deflected upward strongly enough, the receiving device 671 is placed into contact with the guide bolt 564 established on the calibration weight 650. The further deflection of the coil lifts the guide bolt 564 and thus the calibration weight 650 from the resting position RP. Guided by the guide die 663, the guide bolt 664 shifts into a first reversal point 665 situated in the upper right-hand corner of the guide die 663, as shown in FIG. 6b. Upon the subsequent lowering of the receiving device 671—shown in FIG. 6c—the guide bolt 664 is guided through the guide die 663 to a second reversal point 666, which is situated below, approximately in the middle of the guide die 663. Following this, the receiving device 671 is then deflected upward in order to reach the calibration position KP.

Figure 6D:
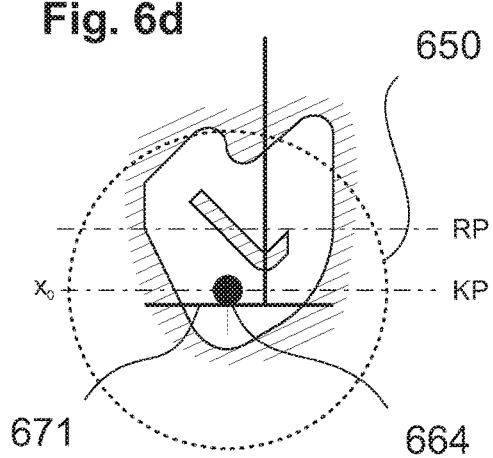
Figure 6E:
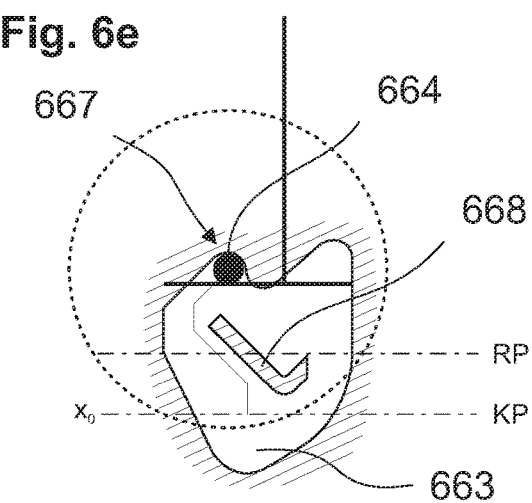

As shown in FIG. 6d, the calibration position KP corresponds to the zero position $x_0$, as it is already assumed in FIG. 5 by the force-measuring device 510. A calibration in the zero position $x_0$ has the advantage that calibration is done in the same position as the weight measurement; or in other words, the reset forces of the flexible bearing then correspond to the reset forces during the weight determination.

After calibration is complete, the movement sequence is continued in order to move the calibration weight 650 back into the resting position RP. The receiving device 671 lifts the calibration weight 650 upward in order to guide the guide bolt 664 into a third reversal point 667. On the way there—see FIG. 6e—the guide bolt 664 is deflected to the left by the isolation element 668 situated in the middle of the guide die 663 in order to subsequently reach the third reversal point 667, guided by the guide die 663. During the subsequent lowering of the receiving device—shown in FIG. 6f—the guide bolt 664 is guided through the guide die 663 back to the resting position. Subsequently, the receiving device 671 is deflected further downward in order to place the force-measuring device 510 into the zero position $x_0$ in order to execute a weight determination.

The form and position of the guide die 664 is matched to the movement sequence of the calibration weight 650 such that the guide bolt 664 always passes the guide die 663 through the gravitational force vector G (representatively shown only in FIG. 6f for FIGS. 6a to 6e) clockwise.

Figure 7A:
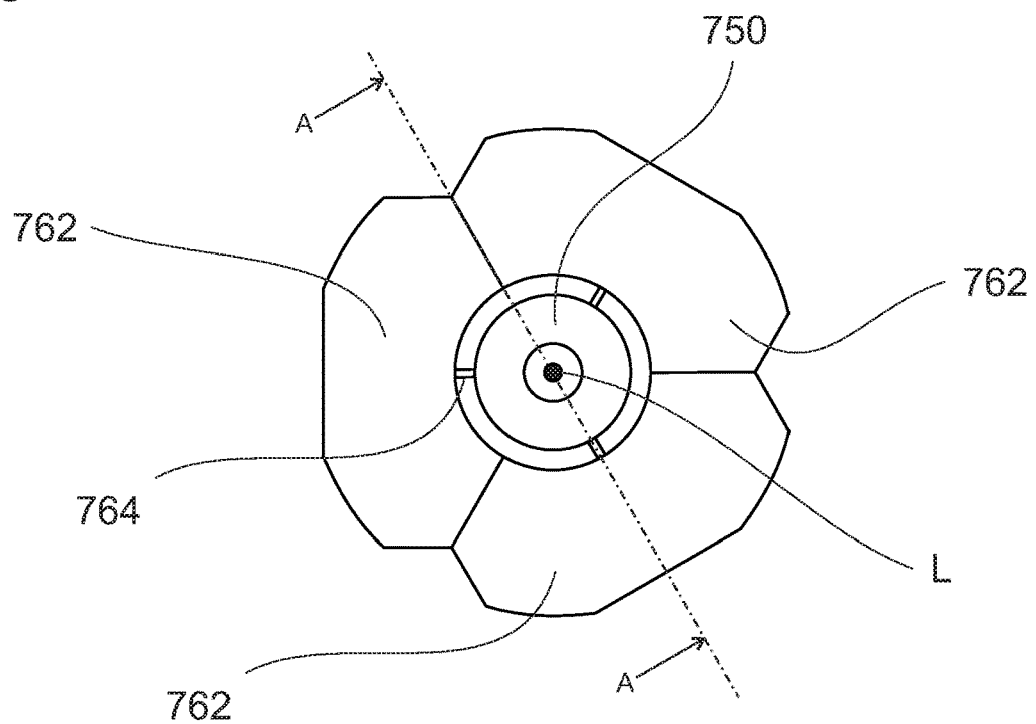
FIG. 7a is a simplified top view of a calibration weight assembly.

FIG. 7a shows a first representation of a calibration weight assembly 700 in the top view. The concentrically designed calibration weight 750 has the form of a ring, wherein said ring can be rotated about an axis L in the center of the ring. In the attached state with the force-measuring device (FIGS. 1 to 4), this axis L is parallel to the resultant force of the measuring sensor 140, 240, 340, 440 or coincides with the resultant force of the measuring sensor 540, as shown in FIG. 5. Three guide pieces 762 are connected to the fixed region of the force-measuring device and form, in the center thereof, a space for the calibration weight 750.

Figure 7B:
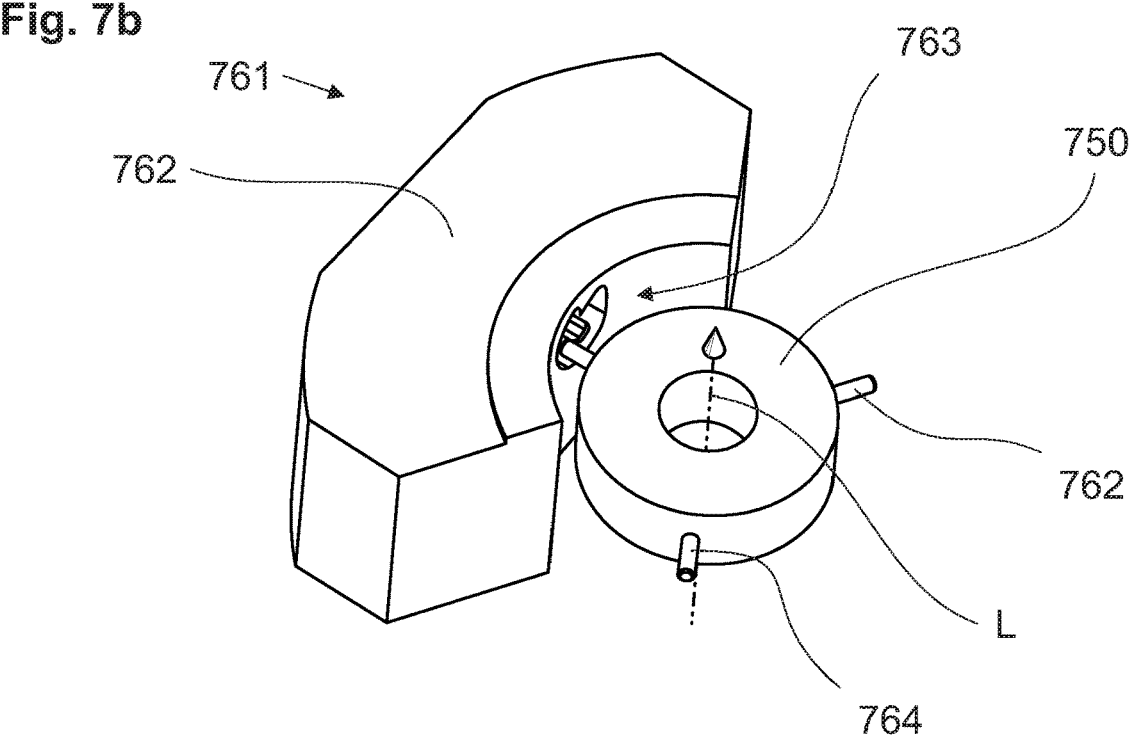

FIG. 7*b* shows a portion of the calibration weight assembly in an isometric view, wherein two of the guide pieces 762 are hidden. The poly-stable positioning element 761 is formed at each of the three guide pieces 762 from a pair comprising the guide die 763 and the guide bolt 764 in each case, wherein the pairs are arranged concentrically spaced apart from one another. The guide die 763, in which the guide bolt 764 is guided, is arranged on the surface of the guide piece 762 pointing toward the formed space in the middle. With the previously mentioned movement sequence, the calibration weight 750 rotates about the axis L slightly in the clockwise direction and opposite the clockwise direction while the guide bolt 764 is following the guide die 763.

Figure 8:
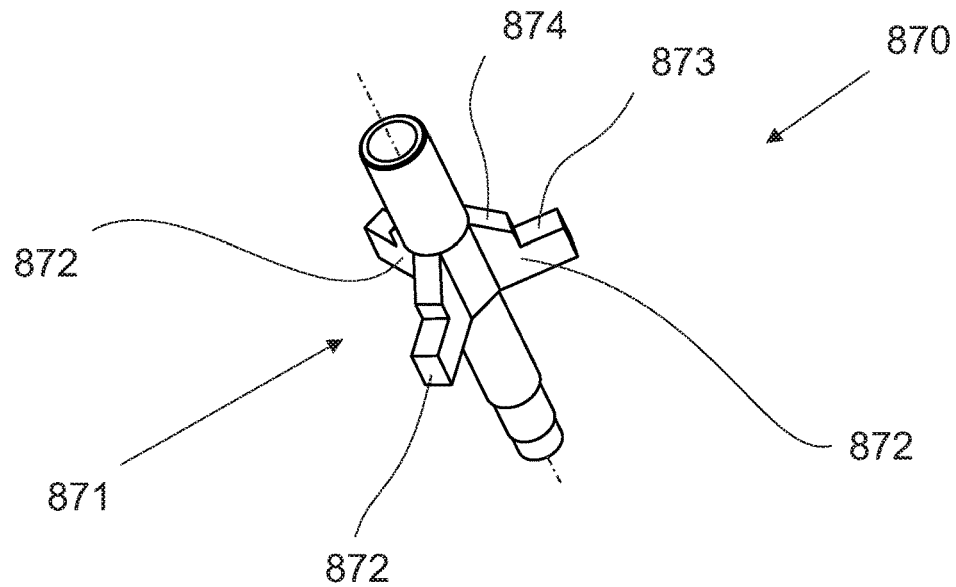
FIG. 8 is a perspective view of an extension attachment with a receiving device for the calibration weight.

FIG. 8 shows an extension attachment 870 with the receiving device 871 for the calibration weight (not shown), which is arranged in the center of the calibration weight formed as a ring. The receiving device 871 has three protrusions 872, each of which are established equidistant to one another distributed about the shaft of the extension attachment 870. Each protrusion 872 has a contact surface 873 vertically aligned with respect to the center axis and a centering surface 874 extending at an angle from the center axis to the contact surface 873. The calibration weight is therefore situated on the receiving device 871, therefore is not permanently connected to the extension attachment 870, so that the calibration weight can move relative to the extension attachment 870. The centering surface 874 in this case helps to keep the calibration weight always in the center on the receiving device 871.

Figure 9A:
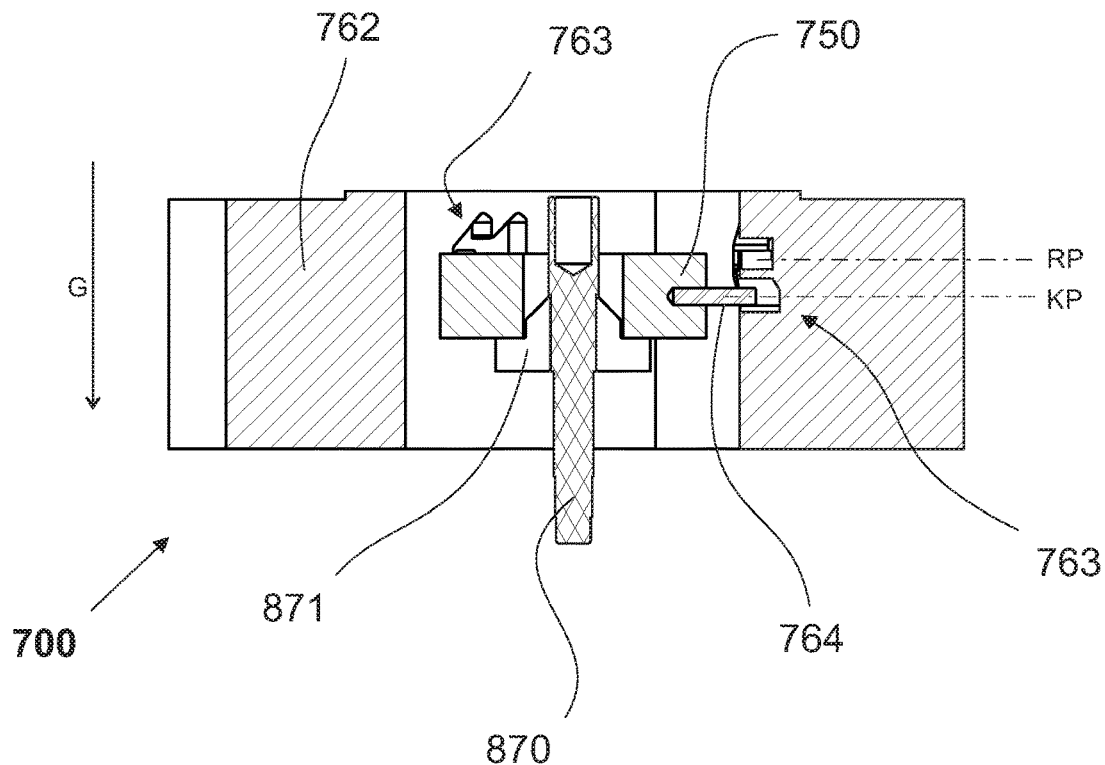
FIG. 9a is a sectional view of the calibration weight assembly of FIG. 7a with the calibration weight in the calibration position.
Figure 9B:
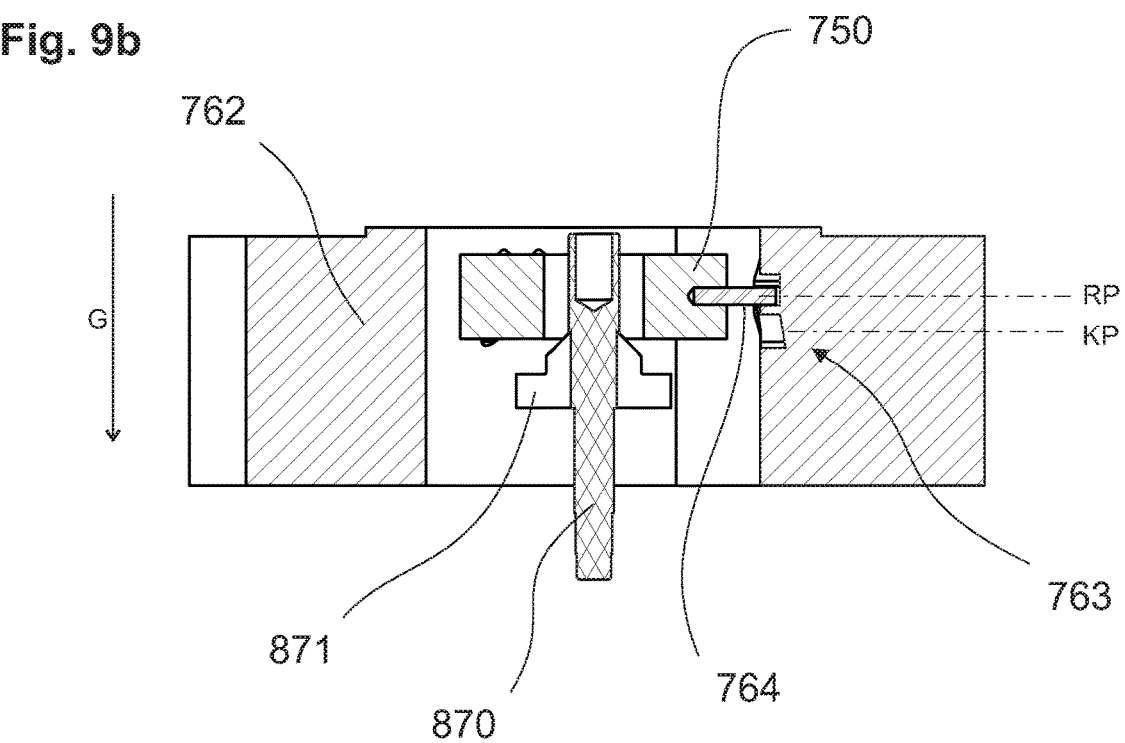
FIG. 9b is a sectional view of the calibration weight assembly from FIG. 9a with the calibration weight in the resting position.

FIGS. 9*a* and 9*b* show the calibration weight assembly from FIG. 7*a* in section A-A. In FIG. 9*a*, the calibration weight 750 is situated in the center on the receiving device 871 of the extension attachment 870; the calibration weight 750 is thus in the calibration position KP. The situation shown in FIG. 9*a* corresponds to that as shown in FIG. 6*a*. To the right side of the calibration weight 750, one of the three guide bolts 764 is visible and connected to the calibration weight 750. The guide bolt 764 protrudes into the guide die 763 of the guide piece 762.

Figure 6F:
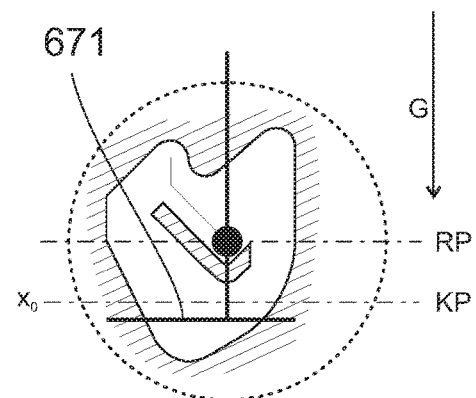

In FIG. 9*b*, the calibration weight 750, held by the guide bolt 764, is situated in the guide die 763; the calibration weight 750 is thus in the resting position RP. The receiving device 871 of the extension attachment 870 is some distance away from the calibration weight 750, that is, it is not in contact with said calibration weight. The situation shown in FIG. 9*b* corresponds to that as shown in FIG. 6*f*. Furthermore, FIG. 9*b*—in contrast to FIG. 9*a*—shows the increasing depth T of the guide die in the direction of the gravitational force vector G. This helps keep the calibration weight 750 always in the middle in the resting position RP when settling in. This alone may be sufficient to center the calibration weight 750. Centering surfaces 874 (FIG. 8) on the receiving device 871 are also possible; both centering operations can be realized on the calibration weight assembly or only one of the two.

The invention described herein is not limited to force-measuring devices with only one measuring sensor. Multi-coil systems are likewise included in the scope, as they are shown, for example, in EP 2 993 449 A. The inventive concept can also easily be transferred to those systems, because one skilled in the art knows that the extension attachment must be adapted for this such that it is connected to all measuring sensors and is deflected parallel to the resultant force of the measuring sensor.

What is claimed is:

1. A calibration weight assembly for a gravimetric measuring device with a force-measuring device that comprises a fixed region, a load-receiving region and a measuring sensor, the calibration weight assembly comprising:
   at least one calibration weight which can be coupled with the load-receiving region and
   a transfer mechanism that comprises at least one poly-stable positioning element, a first stable state of which defines a calibration position of the transfer mechanism and a second stable state of which defines a resting position of the transfer mechanism;
   wherein a movement of the measuring sensor acts upon the transfer mechanism to transfer the at least one calibration weight from the resting position into the calibration position, or vice versa.

2. The calibration weight assembly of claim 1, wherein:
   a center of mass of the at least one calibration weight is arranged either on a resultant force of the measuring sensor or on an axis that extends parallel to the resultant force of the measuring sensor.

3. The calibration weight assembly of claim 2, wherein:
   the calibration weight is designed to be concentric with or rotatable about the resultant force of the measuring sensor, particularly having the form of a ring, a cylinder or a barbell.

4. The calibration weight assembly of claim 1, further comprising:
   a guide piece of the poly-stable positioning element, the guide piece having a guide die; and
   a guide bolt of the poly-stable positioning element, associated with the guide die,
   wherein:
   the guide piece is secured to the fixed region and the guide bolt is secured to the calibration weight; or
   the guide bolt is secured to the fixed region and the guide piece is secured to the calibration weight.

5. The calibration weight assembly of claim 4, wherein:
   the guide die has a form and position that are matched to a movement sequence of the calibration weight, so that the guide bolt always passes through the guide die in the clockwise or counterclockwise direction, due to a gravitational force vector.

6. The calibration weight assembly of claim 5, wherein:
   the poly-stable positioning element has three pairs of guide pieces and guide bolts, the three pairs arranged to be concentrically equidistant from one another.

7. The calibration weight assembly of claim 6, wherein:
   each of the guide dies has a depth that increases in a direction of the gravitational force vector.

8. The calibration weight assembly of claim 5, wherein:
   the poly-stable positioning element has two pairs of guide pieces and guide bolts; and
   the calibration weight has the form of a cylinder or a barbell with a first and a second end surface, with one of the pairs arranged on each of the end surfaces.

9. The calibration weight assembly of claim 8, wherein:
   each of the guide dies has a depth that increases in a direction of the gravitational force vector.

10. The calibration weight assembly of claim 1, further comprising:

an extension attachment of the transfer mechanism, the extension attachment being connected to a moving part of the measuring sensor and having a receiving device for receiving the calibration weight.

11. A force-measuring device, comprising:
a calibration weight assembly according to claim 1, wherein the fixed region of the force-measuring device encloses the load-receiving region, and the calibration weight assembly is arranged above or below the measuring sensor.

12. The force-measuring device of claim 11, further comprising
an extension attachment of the transfer mechanism connected to a moving part of the measuring sensor and having a receiving device for receiving the calibration weight, the extension attachment secured directly to the load-receiving region.

13. The force-measuring device of claim 12, further comprising
a first lever having an input-side lever arm, which is connected to the load-receiving region in a force-transmitting manner, and an output-side lever arm, which is connected to the measuring sensor in a force-transmitting manner directly, or indirectly via at least one second lever; and
a cantilever, located in either the fixed region or the load-receiving region, the cantilever having a coupling region for the calibration weight in the resting position;
wherein the load-receiving region is connected to the fixed region and is movably guided through a pair of parallel legs.

14. The force-measuring device of claim 13, further comprising:
an extension of the input-side lever arm of the first lever;
wherein the extension extends into a space adjoining a side of the load-receiving region that faces away from the fixed region, and is connected there by the extension attachment to the measuring sensor; or the measuring sensor is arranged in the space adjoining the side of the load-receiving region that faces away from the fixed region.

15. A method for operating a calibration weight assembly according to claim 1,
wherein the force-measuring device comprises a measuring sensor that puts out a measuring signal that corresponds to the weight placed, the measuring sensor having a permanent magnet system with an air gap and a coil, movably positioned in the air gap, the coil having a compensation current flowing therethrough during operation of the force-measuring device, wherein the transfer mechanism of the calibration weight assembly further comprises an extension attachment connected to a moving part of the measuring sensor, with a receiving device for receiving the calibration weight, the method of operating comprising the steps of:
providing the calibration weight in a resting position;
changing the compensation current such that the receiving device is moved in the direction of the resting position and contacts the calibration weight;
changing the compensation current further, such that the receiving device is moved further, so that the calibration weight moves from the resting position into a calibration position or from the calibration position into the resting position, respectively; and
changing the compensation current such that the receiving device moves away from the calibration weight after having reached the resting position of the calibration weight.

16. The method of claim 15, wherein the force-measuring device further comprises a controller that controls the compensation current during operation of the gravimetric measuring device based on a position sensor signal such that the coil moves back into a "zero" position specified for determining an applied force due to an electromagnetic force between the coil and the permanent magnet system, wherein the method comprises the following further steps, performed by the controller:
recording the position sensor signal with dependency on the actuated compensation current;
comparing the recorded dependency with a reference dependency stored in a storage device, and outputting a transfer alarm, which represents the exceeding of a tolerance value between the recorded dependency and the reference dependency; and
using an algorithm that contains at least one change in the compensation current opposed to the movement phase, when the transfer alarm is output.

17. The method of claim 15, wherein:
the calibration position corresponds to the position into which the measuring sensor is moved back in a controlled manner in order to determine a force applied to the measuring sensor to correspond to the zero position.

* * * * *